(12) United States Patent
Purpura

(10) Patent No.: US 7,894,357 B2
(45) Date of Patent: Feb. 22, 2011

(54) CAPABILITY-BASED TESTING AND EVALUATION OF NETWORK PERFORMANCE

(75) Inventor: William J. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 462 days.

(21) Appl. No.: 11/702,745

(22) Filed: Feb. 6, 2007

(65) Prior Publication Data

US 2007/0206511 A1 Sep. 6, 2007

Related U.S. Application Data

(63) Continuation-in-part of application No. 11/367,240, filed on Mar. 3, 2006.

(51) Int. Cl.
*H04L 12/26* (2006.01)
(52) U.S. Cl. ............... 370/252; 370/241; 718/100; 718/102; 718/106; 718/107; 709/227; 709/228; 709/229
(58) Field of Classification Search ........... 370/241, 370/252; 716/100, 102, 106; 709/227–229; 718/100, 102–107
See application file for complete search history.

(56) References Cited

U.S. PATENT DOCUMENTS

| | | | |
|---|---|---|---|
| 6,069,894 A * | 5/2000 | Holender et al. ........... 370/397 |
| 6,289,382 B1 * | 9/2001 | Bowman-Amuah ......... 709/226 |
| 6,754,230 B2 | 6/2004 | Purpura |
| 6,801,764 B2 | 10/2004 | Purpura et al. |
| 6,980,546 B2 | 12/2005 | Purpura et al. |
| 7,154,859 B2 | 12/2006 | Purpura |
| 7,441,021 B1 * | 10/2008 | Perry ........................ 709/223 |
| 2002/0053020 A1 * | 5/2002 | Teijido et al. ............... 713/153 |
| 2003/0083041 A1 * | 5/2003 | Kumar et al. ............... 455/406 |
| 2003/0112766 A1 * | 6/2003 | Riedel et al. ................ 370/252 |
| 2003/0212787 A1 * | 11/2003 | Qiu et al. .................... 709/224 |
| 2004/0100901 A1 * | 5/2004 | Bellows ..................... 370/230 |
| 2004/0174822 A1 * | 9/2004 | Bui ............................ 370/252 |
| 2005/0169186 A1 * | 8/2005 | Qiu et al. .................... 370/242 |
| 2006/0109786 A1 * | 5/2006 | Abdel-Kader et al. ....... 370/232 |
| 2006/0193265 A1 * | 8/2006 | Simionescu et al. ......... 370/254 |
| 2006/0198316 A1 * | 9/2006 | Bhagwat et al. ............. 370/252 |
| 2006/0229080 A1 * | 10/2006 | Khan et al. ................. 455/450 |
| 2008/0019275 A1 * | 1/2008 | Mudireddy et al. ......... 370/235 |
| 2008/0049755 A1 * | 2/2008 | Gannon et al. ........... 370/395.1 |

* cited by examiner

*Primary Examiner*—William Trost, IV
*Assistant Examiner*—Charles C Jiang
(74) *Attorney, Agent, or Firm*—Harness, Dickey & Pierce, P.L.C.

(57) ABSTRACT

A method for real-time monitoring of the performance of a network. From a set of predefined network capabilities, one or more of the network capabilities is attributed to an application of the network. Activity of the application running in the network is sampled to individually monitor each capability attributed to the application. This method allows the collection and evaluation of usage information for each application by network capability. A user can also manipulate a NCO environment by adding phantom nodes and/or resources to observe effects on capability loads.

23 Claims, 6 Drawing Sheets

| Infrastructure NCO Capability | KPP | | | | Resource Parameter | | | | Capability Relationship | | | | |
|---|---|---|---|---|---|---|---|---|---|---|---|---|---|
| | KPP1 | KPP2 | KPP3 | KPP4 | CPU | Store | Band | I/O | IO | IA | DM | KM | CCI |
| Interoperability (IU) | | | | | | | | | 1 | | | | |
| Information Assurance (IA) | | | | | | | | | 1 | 2 | | | |
| Data Management (DM) | | | | | | | | | 1 | 2 | 3 | | |
| Knowledge Management (KM) | | | | | | | | | 1 | 2 | 3 | 4 | |
| Collaboration in Communities of Interest (CCI) | | | | | | | | | 1 | 2 | 3 | 4 | 5 |

Fig. 3

| Node 1 F-15 attack A/C | Infrastructure NCO Capability | Targ DT | Res | AU | Ency | Trans | WebT | | |
|---|---|---|---|---|---|---|---|---|---|
| 312a | Application 1: targeting program | | | | | | | Total Impact For This Node Application #1 Impact | |
| 316 | Interoperability | F1: SV, F2: Ph, F3: PT | F1: HR, F2: .HR, F3: T | | | | | | |
| 318 | Information Assurance | | | F1:B | F1:NES F1: SW | | | | |
| 320 | Data Management | | | | F1: VT V2:TT | | | | |
| | Knowledge Management | N/A | N/A | N/A | N/A | N/A | N/A | N/A | N/A |
| 308a | Collaboration Communities of Interest | N/A | N/A | N/A | N/A | N/A | N/A | N/A | N/A |
| 312b | Application 2: Virtual Collaboration Community | Critical KPP | | | | | | | |
| | Infrastructure NCO Capability | Targ DT | Res | AU | Ency | Trans | WebT | | |
| | | | | | | | | Application #2 Impact | |
| | Interoperability | F1: | F1: HR | | | | | | |
| | Information Assurance | | | F1:B | F1:NES | | | | |
| | Data Management | N/A | N/A | N/A | N/A | N/A | N/A | N/A | N/A |
| | Knowledge Management | N/A | N/A | N/A | N/A | N/A | N/A | N/A | N/A |
| | Collaboration Communities of Interest | | | | | F1:B | | | |
| Node 2 AWCS A/C | Infrastructure NCO Capability | Targ DT | Res | AU | Ency | Trans | WebT | | |
| 312c | Application 1: Virtual Collaboration Community | | | | | | | Application #1 Impact | |
| | Interoperability | F1: | F1: HR | | | | | | |
| | Information Assurance | | | F1:B | F1:NES | | | | |
| 308b | Data Management | N/A | N/A | N/A | N/A | N/A | N/A | N/A | N/A |
| | Knowledge Management | N/A | N/A | N/A | N/A | N/A | N/A | N/A | N/A |
| | Collaboration Communities of Interest | | | | | F1:B | | | |
| Node 3 Ground Sensor | Infrastructure NCO Capability | Targ DT | Res | AU | Ency | Trans | WebT | | |
| 312d | Application 1: targeting data | | | | | | | Application #1 Impact | |
| | Interoperability | F1: SV | F1: HR | | | | | | |
| | Information Assurance | | | F1:B | F1:NES | | | | |
| | Data Management | | | | | F1: VT | | | |
| | Knowledge Management | N/A | N/A | N/A | N/A | N/A | N/A | N/A | N/A |
| 308c | Collaboration Communities of Interest | N/A | N/A | N/A | N/A | N/A | N/A | N/A | N/A |

Fig. 4A

| Master Mission Resource Matrix | | | | | | | Total Environment Surplus Resource Availability | | | | | | |
|---|---|---|---|---|---|---|---|---|---|---|---|---|---|
| BW | RAM | 802 I/O | DM I/O | Ency | CPU | WebT | BW | RAM | 802 I/O | DM I/O | Ency | CPU | WebT |
| Sum | Sum | Sum | Sum | Sum | Sum | Sum | 30.0% | 34.5% | 75.0% | 100.0% | 60.0% | 99.6% | 90.0% |
| Resource Parameter | | | | | | | Overall Resource Usage | | | | | | |
| BW | RAM | 802 I/O | DM I/O | Ency | CPU | WebT | BW | RAM | 802 I/O | DM I/O | Ency | CPU | WebT |
| | | | | | | | 32.5% | 30.3% | 12.5% | 0.0% | 20.0% | 0.2% | 0.0% |
| | | | | | | | 25.0% | 25.3% | 12.5% | 0.0% | 20.0% | 0.2% | 0.0% |
| F1: 10, F2: 1, F3: .25 | F1:1G, F2:.1G, F3:.1G | F1B, F2:B, F3:B | F3:B | | | | 5.0% | 5.0% | 12.5% | | | | |
| F1: 1M, F2: .1K | F1: 1M F2:.1K | | | F1:B, F2:B, | | | 20.0% | 20.0% | | | 10.0% | | |
| | F1:.25M | | | F1:.5 M F2: .25k | | | | 0.3% | | | 10.0% | 0.2% | |
| N/A | N/A | N/A | N/A | N/A | N/A | N/A | N/A | N/A | N/A | N/A | N/A | N/A | N/A |
| N/A | N/A | N/A | N/A | N/A | N/A | N/A | N/A | N/A | N/A | N/A | N/A | N/A | N/A |
| Resource Parameter | | | | | | | Overall Resource Usage | | | | | | |
| BW | RAM | 802 I/O | DM I/O | Ency | CPU | WebT | BW | RAM | 802 I/O | DM I/O | Ency | CPU | WebT |
| | | | | | | | 7.5% | 5.0% | 0.0% | 0.0% | 0.0% | 0.0% | 0.0% |
| F1: 256K | F1:B | | | | | | 2.50% | | | | | | |
| F1: 1M | F1: 1M | | | F1:B | | | 5.0% | 5.0% | | | | | |
| N/A | N/A | N/A | N/A | N/A | N/A | N/A | N/A | N/A | N/A | N/A | N/A | N/A | N/A |
| N/A | N/A | N/A | N/A | N/A | N/A | N/A | N/A | N/A | N/A | N/A | N/A | N/A | N/A |
| F1: 1M | F1:.25M | | | | | F1:B | 5.0% | 5.0% | | | | | 0.1 |
| BW | RAM | 802 I/O | DM I/O | Ency | CPU | WebT | BW | RAM | 802 I/O | DM I/O | Ency | CPU | WebT |
| | | | | | | Total Impact For This Node | 12.5% | 10.0% | 0.0% | 0.0% | 0.0% | 0.0% | 10.0% |
| | | | | | | | 12.5% | 10.0% | 0.0% | 0.0% | 0.0% | 0.0% | 10.0% |
| F1: 256K | F1:B | | | | | | 2.50% | | | | | | |
| F1:1M | F1:1M | | | F1:B | | | 5.0% | 5.0% | | | | | |
| N/A | N/A | N/A | N/A | N/A | N/A | N/A | N/A | N/A | N/A | N/A | N/A | N/A | N/A |
| N/A | N/A | N/A | N/A | N/A | N/A | N/A | N/A | N/A | N/A | N/A | N/A | N/A | N/A |
| F1: 1M | F1:.25M | | | | | F1:B | 5.0% | 5.0% | | | | | 0.1 |
| BW | RAM | 802 I/O | DM I/O | Ency | CPU | WebT | 25.0% | 25.3% | 12.5% | 0.0% | 20.0% | 0.2% | 0.0% |
| | | | | | | | 25.0% | 25.3% | 12.5% | 0.0% | 20.0% | 0.2% | 0.0% |
| F1: 10 | F1: 1G | F1B | F3:B | | | | 5.0% | 5.0% | 12.5% | | | | |
| F1:1M | F1:1M | | | F1:B | | | 20.0% | 20.0% | | | 10.0% | | |
| | F1:.25M | | | F1:.5 | | | | 0.3% | | | 10.0% | 0.2% | |
| N/A | N/A | N/A | N/A | N/A | N/A | N/A | N/A | N/A | N/A | N/A | N/A | N/A | N/A |
| N/A | N/A | N/A | N/A | N/A | N/A | N/A | N/A | N/A | N/A | N/A | N/A | N/A | N/A |

Fig. 4B

CAPABILITY-BASED TESTING AND EVALUATION OF NETWORK PERFORMANCE

CROSS-REFERENCE TO RELATED APPLICATIONS

This application is a continuation-in-part of U.S. patent application Ser. No. 11/367,240 filed on Mar. 3, 2006, the disclosure of which is incorporated herein by reference in its entirety. This application is also related to U.S. patent application Ser. No. 11/702,746, and U.S. patent application Ser. No. 11/702,747, filed on the same date as this application, the disclosures of which are incorporated herein by reference in their entirety.

FIELD

The present disclosure relates generally to communication and digital exchange networks and more particularly (but not exclusively) to methods and systems for testing and/or evaluating network performance impacts of applications and network-compatible devices executing in network-centric operations and/or other network environments, including but not limited to system-of-systems environments.

BACKGROUND

The statements in this section merely provide background information related to the present disclosure and may not constitute prior art.

In large networks and network environments, it is not unusual for network development and usage to be incremental and piecemeal, particularly in an enterprise and/or system-of-systems environment. Network-centric operations (NCO) environments are particularly complex and typically include ad-hoc and/or mobile nodes and applications for which resources are to be provided on an ad-hoc basis. It would be desirable to understand whatever issues may arise in connection with network resources, performance, and network management when a new application, system and/or configuration is introduced onto a network. It also would be desirable to be able to assess core capabilities of an existing or planned NCO environment to understand impacts of emerging net-centric technology. Current methods of measuring and evaluating potential network impacts, however, are not adequate to address the complexities of evolving, transient, ad-hoc and/or mobile NCO environments.

SUMMARY

The present disclosure, in one implementation, is directed to a method for real-time monitoring of the performance of a network including a plurality of nodes having one or more applications. From a set of predefined network capabilities, one or more of the network capabilities is attributed to an application of the network. Activity of the application running in the network is sampled to individually monitor each capability attributed to the application.

In another implementation, the disclosure is directed to a method for real-time monitoring of the performance of a network including a plurality of nodes having one or more applications. For each of a plurality of applications of the network, the method includes attributing to the application one or more network capabilities from a set of predefined network capabilities and conditioning each of the one or more network capabilities attributed to the application by one or more performance parameters. Based on the performance parameters, one or more network resources are assigned to each of the one or more capabilities attributed to the applications. Resource use in the network is sampled to monitor each of the one or more capabilities individually.

In yet another implementation, the disclosure is directed to a system for real-time monitoring of the performance of a network including a plurality of nodes having one or more applications. The system includes one or more computers configured to perform as follows. For substantially each application running in the network, for each of one or more predefined network capabilities attributed to the application, resource usage by the application in support of the predefined network capability is modeled. The modeled usage is used to monitor, by capability, network resource usage.

In still another implementation, the disclosure is directed to a method for real-time monitoring of the performance of a network having a plurality of applications. The method includes imposing a predefined set of capabilities for each application, selecting a capability across the applications in the network, dynamically monitoring the activity of the selected capability across the applications and determining a cumulative value for the monitored activities, and determining when the cumulative value of activities of the selected capability exceeds a predetermined value that affects the performance of the network.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a control matrix in accordance with one implementation of the present disclosure;

FIG. 4A is the first part of a status matrix in accordance with one implementation of the present disclosure;

FIG. 4B is the second part of the status matrix shown in FIG. 4A; and

DETAILED DESCRIPTION

The following description is merely exemplary in nature and is not intended to limit the present disclosure, application, or uses.

Although various implementations of the present disclosure may be described with reference to network-centric operations (NCO) and military applications, the disclosure is not so limited. The disclosure may be implemented relative to many different networks and network-centric environments, including but not limited to various enterprise systems and non-military applications.

The inventor has observed that it is desirable to understand potential demand for network resources generated by specific net-centric capabilities when setting expectations for performance and behavior of individually validated systems in the context, e.g., of real-world system-of-systems operations. Impacts of such capabilities on network performance as a whole tend to be cumulative, multi-dimensional, complex, and application- and/or mission-dependent. Thus there could be a potential for risk at a system-of-systems level for impact on application effectiveness and network viability. Network resource margins potentially consumed by incremental addition of devices and/or applications with net-centric capabilities may include bandwidth, systems input/output (I/O) and throughput, computation and storage, among others.

It is the inventor's opinion that analysis supporting net-centric system-of-systems synthesis and optimization would be most effectively executed in an interactive modeled environment. Strategies for implementation of a network might be altered, for example, in response to a simulated view (model) of a fully engaged net-enabled environment. Modeling might lead, e.g., to a conclusion that utilization of particular candidate items and/or systems should be rejected because of their impact on a total host environment due to resource conflicts. Emulation could lead to rational reduction of risk during an acquisition process, to strategic allocation of networked resources to systems at acquisition time, and to reduced operational risk at deployment time.

The inventor has observed a need to focus on how network resource demands might emerge in real world net-centric operations and possibly cause risk to application and/or mission effectiveness. It is desirable to identify any first-order interactions that might lead to disruptive behavior in a network, e.g., due to resource conflicts. In various implementations of the disclosure, methods are provided for testing and evaluating how such interactions may degrade or cripple a network.

The present disclosure, in one implementation, is directed to a method for real-time monitoring of the performance of a network. Various implementations provide means for emulation and prototyping in a NCO environment, by which users may view and assess effectiveness of various NCO capabilities as further described below.

Figure 1:
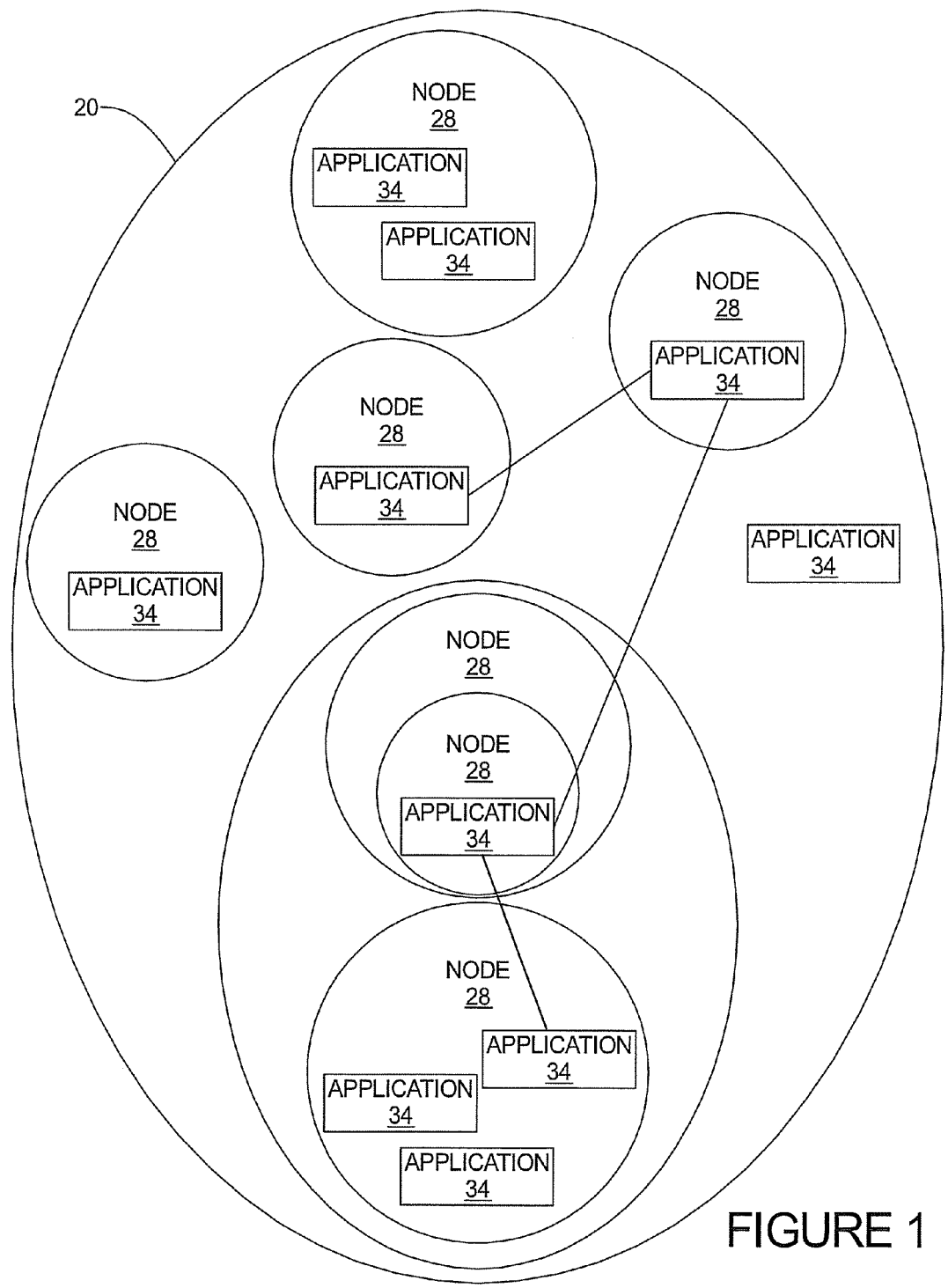
FIG. 1 is a diagram of a network in accordance with one implementation of the present disclosure.

An exemplary network is indicated generally in FIG. 1 by reference number 20. The network 20 includes a plurality of nodes 28 each capable of communicating with one or more nodes 28 of the network. One or more nodes 28 may be ad hoc and/or mobile. Unless otherwise indicated, the term "node" may include a network, a sub-network, a sub-node and/or an elemental member of a network, and the term "network" may include a sub-network, a system-of-systems, an enterprise and/or a network-centric operations environment. It should be noted that various implementations are contemplated in connection with many types of multi-layered networks and NCO environments, and so the terms "node", "network", "system" and the like may be used interchangeably. An entity that connects to a level above itself may be referred to as a "node", e.g., by the higher-level network to which the connection is made.

The nodes 28 support one or more applications 34. In some implementations, a framework (also called a set) of network capabilities are predefined for the network 20 as further described below. For a given application 34 of the network 20, one or more of the network capabilities are attributed to the application 34. Activity of the given application 34 running in the network 20 is sampled to individually monitor each capability attributed to the application.

In various implementations, impacts (if any) of each predefined network capability on the network 20 environment are modeled. The modeling is performed in an essentially continuous real-time manner although, in some implementations, modeling could be performed, e.g., on a "snapshot" basis. Testing and evaluation of each network capability can be performed to determine, e.g., how a given application 34, node 28, sub-network and/or the network 20 "consumes" network environment resources. Impact(s) may be observed, e.g., on processing, storage (RAM/drive), bandwidth, and/or input/output (I/O) port availability in the network 20. Accordingly, a determination can be made as to what resources remain available, e.g., for usage in the network 20 after resource usage by a given network capability.

In the present exemplary implementation, a framework of network capabilities is predefined for the network 20 and is applicable to substantially all applications 34 in the network 20. Network capabilities include the following:

1) Interoperability: capability to connect, communicate, exchange, and understand information and operate together to achieve a common goal. Modeling of interoperability and its system impacts would take, e.g., the following aspects into consideration:
   (a) development and usage of standardized System of System (SoS) common NCO architectures and reference models, based around Open Systems Interconnection (OSI) layers and Internet Protocol (IP) utilizing common communication methodologies and technologies addressing planned capability growth and obsolescence avoidance; and
   (b) information, communication and application interoperability;
   (c) minimum level(s) of communication between nodes and enterprises.

2) Information assurance: Assurance that a system can be relied on to provide data that is trustworthy and secure. Modeling of information assurance and its system impacts would take, e.g., the following aspects into consideration:
   (a) providing for measures that protect and defend information and information systems by ensuring their availability, integrity, authentication, confidentiality and non-repudiation;
   (b) providing for restoration of information systems by incorporating protection, detection, and reaction capabilities;
   (c) methodologies for authorization, verification, detection and defense of a NCO system operating in a multiple-level security (MLS) environment.

3) Data management: Capability to store, share, organize, retrieve and distribute understandable information and its importance and implications of information to achieve a goal. Modeling of data management and its system impacts would take, e.g., the following aspects into consideration, to allow for identification of common data sharing modes and/or formats supported and/or currently utilized:
   (a) development of information dissemination management systems for intelligent data-centric driven knowledge creation and conversion of data to knowledge before presentation to user via a seamless and/or intuitive human interface to address standard human interface for device/system type, man-machine interface, NCO human factors, and common/standard device interface for device/system type;
   (b) understanding of tools for automatic analysis of developed data alignment, commonality verification, completeness and comparison; development and retrieval of lessons learned, and basic knowledge management;
   (c) understanding of ontology and lexicon (including common format, metadata, language translation, vocabulary development) as applied to NCO knowledge management including bridging methodologies to harmonize different ontologies.

4) Knowledge management: Ability to locate and obtain information with or without prior knowledge of its location or ownership. Modeling of knowledge management and its system impacts would take, e.g., the following aspects into consideration, to allow for identification of common knowledge sharing methodologies supported and/or currently utilized:
   (a) registration (ad hoc and a priori) in a system of systems (SoS) environment, with system and node level differentiation discussions;
   (b) in a system of systems (SoS) environment, with system and node level differentiation discussions, discovery (such as publish and subscribe, smart pull/smart push, information brokerage, handle-information-only-once), failure mode, criticality analysis, and systemized risk assessment.

5) Collaboration in communities of interest: Ability for users, across systems and systems of systems, to collaborate, e.g., in two types of groups of common interest: birds of a feather groups (subject matter experts) and groups focused on completing a specific task who locate and obtain information with or without prior knowledge of its location or ownership.

Each of the foregoing network capabilities may be separately monitored in the network 20 to allow evaluation and/or testing, by capability, of capability loading of the network 20. Nominal (i.e., static) and/or operational (i.e., dynamic) balancing of capability loading may be performed. This balancing is performed through ad hoc modeling of the network 20 by each capability, at the application level, while operating under fully simulated operational conditions.

Figure 2:
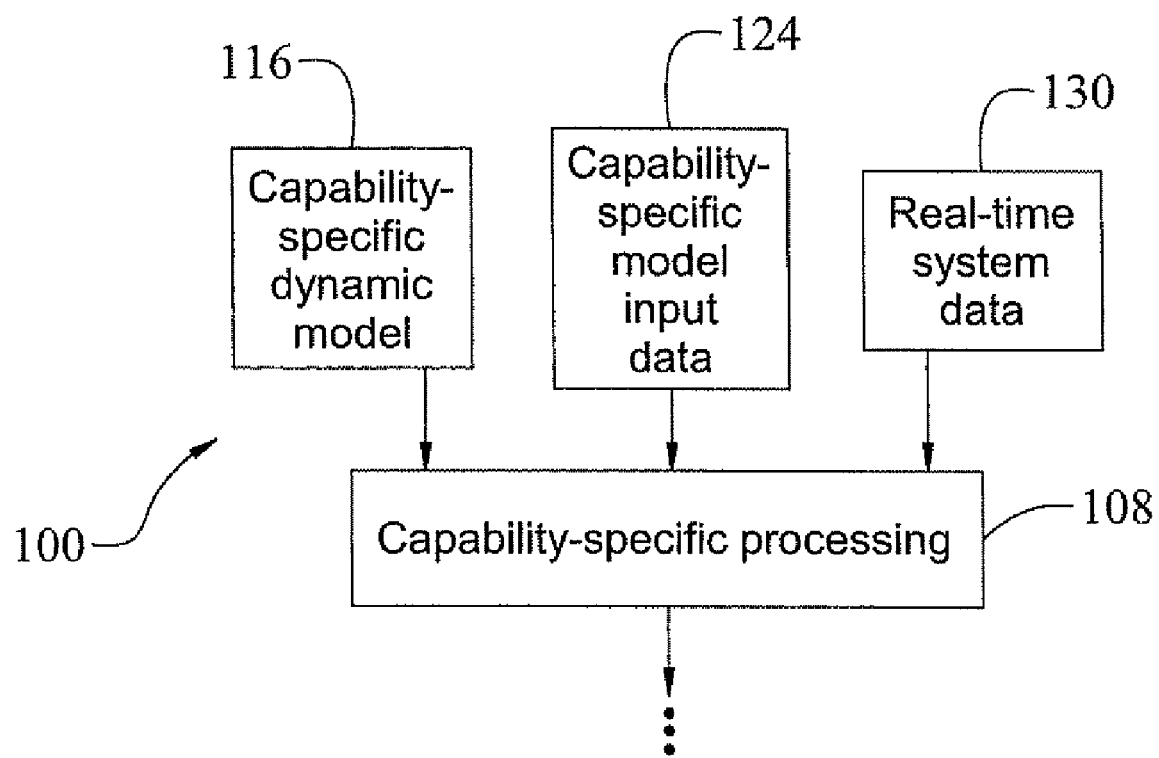
FIG. 2 is a diagram of ad-hoc modeling in accordance with one implementation of the present disclosure.

A simplified diagram of ad-hoc modeling is indicated generally in FIG. 2 by reference number 100. Inputs to capability-specific processing 108 include a capability-specific dynamic model 116, capability-specific model input data 124, and real-time system data 130. In capability-specific processing 108, real-time system data 130, e.g., sampled from activity of a given application 34 and from the network 20, may be evaluated relative to data produced using the dynamic model 116 and model input data 124.

For a given application 34, one or more performance parameters are defined which are specific to the application and to a given capability attributed to the application. A performance parameter qualifies and/or constrains activity of an application. For example, where an application 34 is for an ability to send voice-over-Internet Protocol (VoIP), two of the foregoing network capabilities may be attributed to the application: (1) interoperability and (2) information assurance. A first interoperability performance parameter may be used to specify connection type. There could be, for example, two connection options for the VoIP application 34, each of which may be referred to as a "functionality level": (1) a satellite phone connection, and/or (2) an FM line-of-sight transceiver connection.

A second interoperability performance parameter may be used to specify bandwidth(s) needed to support the foregoing two functionality levels. For the information assurance capability, there may be one performance parameter: whether or not a user has access to a password for using the application. The present exemplary VoIP application 34 would not utilize the higher-order capabilities, i.e., data management, knowledge management, and collaboration of communities of interest.

In various implementations, Net-Ready Key Performance Parameters (NR-KPPs) provided by the U. S. Department of Defense (DoD) are used as performance parameters, e.g., for performance measurement. As known in the art, KPPs are measurable, testable, or calculable characteristics and/or performance metrics required for timely, accurate and complete exchange and use of information. In some implementations, up to four KPPs may be provided for each capability of an application. It should be noted, however, that in various other implementations, other or additional types and/or numbers of performance parameters could be used to provide performance conditions and/or requirements applicable to network capabilities of applications 34. It also should be noted that the foregoing capability framework could be defined differently for different networks, depending, for example, on a particular network's characteristics and complexity.

Associated with each application 34 is a control matrix that includes information relating to each network capability for that application. An exemplary control matrix is indicated generally in FIG. 3 by reference number 200. For each application capability 208, up to four capability-specific performance parameters 212 (in the present example, KPPs) may be specified. For each capability 208, resource parameters 218 indicate resource usage by the application. For the present exemplary matrix 200, resource parameters 218 are included for processing 224, storage 228, bandwidth 232, and input/output (I/O) ports 236. For a given capability 208, the resource parameters 218 for each resource may indicate a range of values, e.g., a minimum value 240, an average value 242, and a maximum value 244 of each identified resource of the network 20 required to operate every sub-capability of the given capability 208 utilized by the application 34 and/or node 28 being monitored as further described below. Accordingly, values included in the resource parameters 218 may represent, e.g., physical units such as gigabytes of storage or megabits of bandwidth. Other types of values also are contemplated and may vary widely in accordance with a wide variety of types of resources that may be monitored in various implementations.

It should be noted generally that a capability is provided by the sum of its sub-capabilities. Thus "sub-capability" may be used to refer, for example, to interoperability utilized by one application 34 of a node 28 having two applications 34, while "capability" may refer to total interoperability utilized by the node, i.e., interoperability utilized by both applications. Similarly, interoperability utilized by one (a "first") node 28 may be a sub-capability of a second node of which the first node is a sub-node. The term "capability" may be used in this disclosure and in the claims to refer to a sub-capability and/or a capability.

A relationship hierarchy 250 is defined among the NCO capabilities 208, to specify an order in which the capabilities 208 are evaluated. It can be appreciated by those knowledgeable in the art that the order of the hierarchy 250 reflects relative dependencies intrinsic to the capabilities 208. For example, interoperability 258 is first in the hierarchy 250 since interoperability is the ultimate basis from which all of the higher-level four capabilities depend. It can be seen that information assurance 262 depends on interoperability 258, data management 266 depends on information assurance 262, knowledge management 272 depends on data management 266, and collaboration in communities of interest 276 depends on knowledge management 272. In other words, all higher-order NCO capabilities require at least interoperability, and possibly additional intermediary capabilities 208, to provide their capabilities.

In the present exemplary implementation, up to four resources 218 per capability 208 per application 34 may be evaluated. Other numbers of resources may be evaluated in various other implementations. More than four resources may be evaluated, although at increased processing times. Generally, once the resource requirements for interoperability are initially determined for an application 34, the cumulative impact(s) (if any) of every succeeding higher order capability (if any) of the application are measured and added to develop a measure of total resources 218 utilized by the application 34.

During testing and evaluation, a measure of total resources utilized may be obtained, e.g., with a percent utilization by each capability separately. The capability relationships 250 reflect an order of analysis that takes place based on the NCO sub-capabilities utilized by a particular unit (e.g., application, node, subnet or network) being measured. The resource parameters 218 of the application matrix 200 are updated to reflect the dynamic modeling and capability processing results. Thus, network resource usage by an application 34 can be apportioned among the application's network capabilities. It should be noted that testing of multiple systems in the same environment focuses primarily on their impact on the environment itself rather than their impacts on one another.

Another example shall now be described with reference to an application 34 for an encryption device. The encryption device application utilizes interoperability 258 and information assurance 262. When the encryption device application 34 is running in the network 20, it utilizes network resources, e.g., processing 224, bandwidth 232, storage 228 and/or one or more I/O ports 236. In the present exemplary implementation, network resource usage by the encryption device application 34 is sampled and evaluated with reference to each of the two capabilities of the application 34.

For example, and referring again to FIG. 2, ad-hoc modeling is performed for the encryption device application 34 as follows. System data 130, including resource utilization data for the encryption device application 34, is input, along with interoperability-specific model input data 124 and an interoperability-specific dynamic model 116, to interoperability processing 108. Interoperability-specific KPPs 212 are used as criteria for evaluating resource utilization by the application 34.

Additionally, system data 130, including resource utilization data for the encryption device application 34, is input, along with information assurance-specific model input data 124 and an information assurance-specific dynamic model 116, to interoperability processing 108. Information assurance-specific KPPs 212 are used as criteria for evaluating resource utilization by the application 34.

In some implementations, each node 28 in the network 20 includes a control matrix 200 in which resource parameters 218 may be cumulatively monitored for all applications 34 in that node 28. Resource parameters 208 for a network of nodes thus would reflect resource usage for applications of the nodes. By processing every application in the network 20 in the foregoing manner, resource usage across the network 20 can be sampled and accumulated by network capability. In various implementations, capability loading data, La, data descriptive of resource use by capability, can be requested from and collected at any node 28, including but not limited to any sub-network of the network 20.

An exemplary status matrix in accordance with one implementation of the disclosure is indicated generally in FIGS. 4A and 4B by reference number 300. The matrix 300 describes three nodes 308a-308c running in a network environment. Referring to FIG. 4A, the node 308a, an F-15 attack aircraft, has two applications 312, i.e., a targeting program 312a and a virtual collaboration community application 312b. Node 308b, an airborne warning and control system aircraft, has one application, i.e., a virtual collaboration community application 312c. Node 308c, a ground sensor, has one application i.e., a targeting data application 312d. The targeting application 312a utilizes interoperability 316, information assurance 318, and data management 320. For interoperability 316, two KPPs 324 are specified. KPP 324a specifies a targeting data type, which may be at one of three functional levels 330. Levels 330, i.e., functional levels F1, F2 and F3, specify (respectively) streaming video (SV), photo (Ph), and pure text (PT). The KPP 324b specifies resolution for the targeting data. Specifically, for the functional levels F1 and F2, the KPP 324b specifies high resolution (HR). For the functional level F3, the KPP 324b specifies text (T). In the same or similar manner capabilities and KPPs are shown for information assurance 318 and data management 320 for the application 312a as well as for the other applications 312.

Referring to FIG. 4B, resource parameters 340 are shown, e.g., for interoperability for the application 312a as follows. Bandwidth 342 is 10 megabytes for functional level F1, 1 megabyte for functional level F2, and 0.25 megabytes for functional level F3. Storage 344 is 1 gigabyte for functional levels F1, F2 and F3. Resource parameters 340 include two I/O types for the application 312a, i.e., 802 I/O 346 and digital modem (DM) 348. The I/O type 346 is binary (B) for the three functional levels 330. The I/O type 348, which is not used for functional levels F1 or F2, is specified as binary (B) for the functional level F3.

When the nodes 308 are running in the environment, modeling is performed, capabilities are dynamically evaluated and their resource usage accumulated as previously described, to provide overall resource usage 360 by the nodes 308. From the node totals 360, total environment surplus resource availability 368 can be determined.

Figure 5:
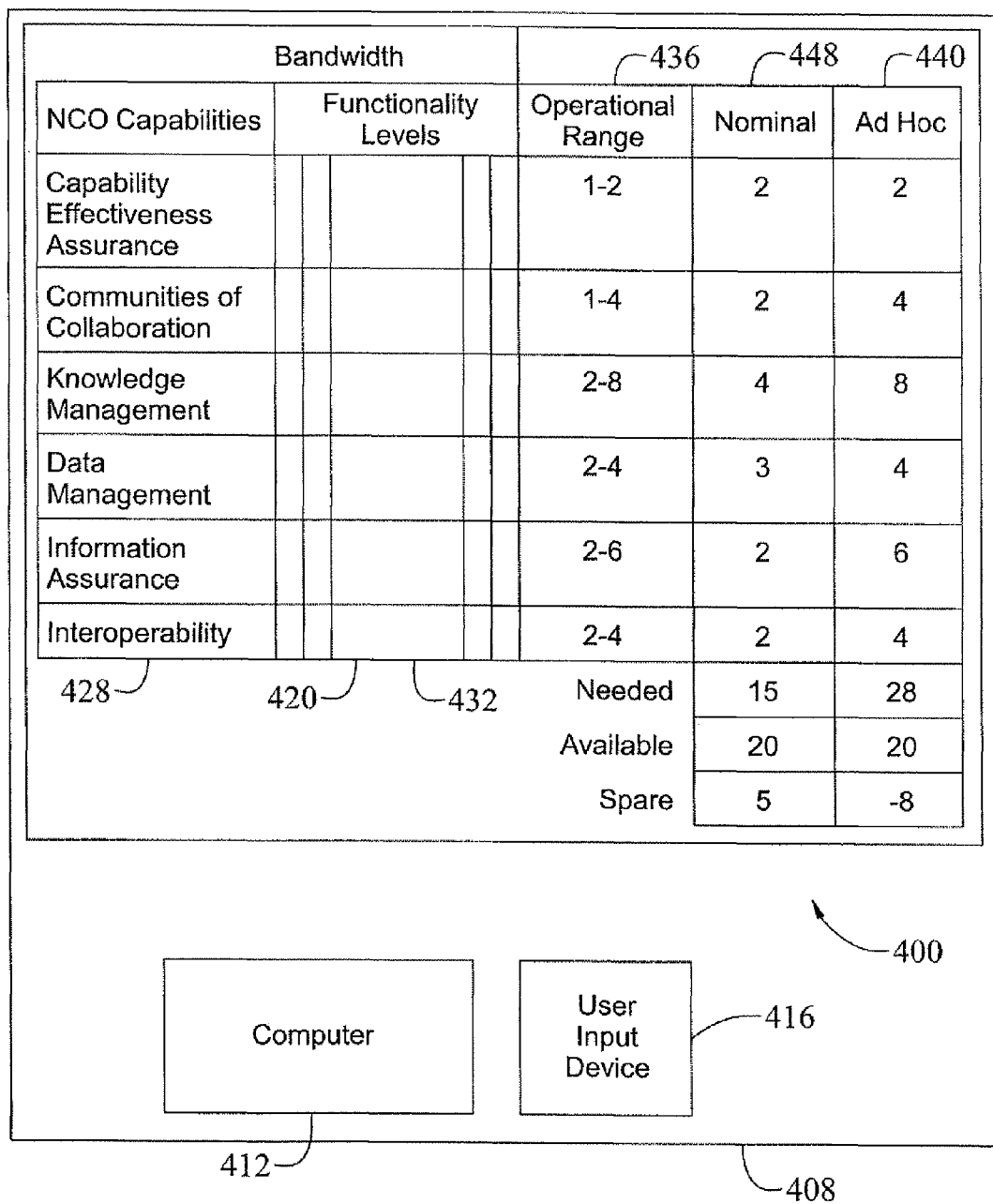
FIG. 5 is a diagram of a system for real-time monitoring of network performance in accordance with one implementation of the present disclosure.

Capability loading data can be dynamically displayed. One implementation of a display for use in network performance testing and/or evaluation is indicated generally in FIG. 5 by reference number 400. The display 400 is included in a system 408 for real-time monitoring of network performance in accordance with one embodiment of the disclosure. The system 408 includes one or more computers 412 in communication with a network (not shown) whose performance may be evaluated in accordance with implementations of the disclosure. The system 408 also includes a user input device 416, e.g., a keyboard, which together with the display 400 provides a user interface with the system 408.

On the display 400 is shown a matrix 420 describing one environment resource being evaluated, e.g., bandwidth. It should be noted that where, e.g., storage, CPU, I/O and bandwidth are being evaluated, three additional matrices would be used in the same or similar manner to display data for the three other resources being evaluated. The matrix 420 includes data for NCO capabilities 428, which in the present example are the foregoing capabilities described above. For each capability 428, a range of supported functionality levels 432 are provided. Operational ranges 436 include a range for each capability 428 and may vary by functionality level 432 specified for each resource (in this case, bandwidth.) The minimum and maximum values of the ranges 436 may be determined as bounding requirements, e.g., to support all possible functionality levels 432. The range values 436 are physical and/or performance requirements, e.g., 200 kps-4 Mps with a nominal of 500 kps for bandwidth.

A user of the system 408 may use the display 400 to detect various conditions in the network being tested. For example, if an ad-hoc value 440 for a capability 428 exceeds a nominal value 448 associated with the capability, the user may refer, e.g., to one or more matrices 200 and/or 300 to obtain node data for one or more sub-networks of the test network to determine, e.g., which application in the test network is consuming an excess of resources. The user may then, for example, cause the "greedy" application to be terminated in order to return resource parameters for the capability to a normal level. Alternatively, e.g., for evaluation purposes, a functionality level for the application could be adjusted until it no longer negatively impacts the environment and/or can allow the unit to function above a defined capability effectiveness assurance (CEA) level. Capability effectiveness assurance is further described in U.S. patent application Ser. No. 11/367,240 filed on Mar. 3, 2006, the disclosure of which is incorporated herein by reference in its entirety.

In some implementations, a user may wish to test a system within a network environment by introducing "phantom" applications relating to the test system into the environment. Where such applications are configured in accordance with implementations of the disclosure, they may be used to emulate the test system in the network environment.

The foregoing methods and systems make it possible to adjust initial planning and/or design of net-centric environments while adjustments can be easily made. The foregoing modeling approach can be implemented, e.g., using methodologies related to self-synchronizing (also referred to as self-healing), loosely coupled networks and their ability to stabilize given appropriate stimulation. Such methodologies may relate, e.g., to ad-hoc global networks, actor-network theory, etc. Models are contemplated which characterize net-centric capabilities and supporting infrastructure. Emulation methodologies can be applied and automated into tool sets in accordance with various implementations. While static evaluation of a "greedy" entity in accordance with known methods might result in approval of its implementation in a network, testing and evaluation of a "greedy" entity in accordance with the present disclosure can indicate, e.g., how interactions between entity and network may degrade or cripple the network.

Various implementations of the disclosure can be used by customers to sanity-check RFPs before release for risk reduction. It would also enable rapid prototyping of proposed designs for risk reduction. Further it allows for rapid credible evaluation of integration of legacy platforms and/or systems with proposed future combined environments. Implementations of the foregoing methods and systems allow NCO capabilities to be stripped out based on system needs in order to study environment impact.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for real-time monitoring of the performance of a network including a plurality of nodes having one or more applications, the method comprising:
predefining an ordered relationship hierarchy of network capabilities providable by applications in the network;
attributing, from the hierarchy, one or more of the network capabilities to a given application of the network;
modeling each of the one or more attributed capabilities of the given application, the modeling being executed by at least one processor;
using the processor to evaluate use of one or more network resources by the modeled capability as the given application executes in the network; and
based on the modeling, using the processor to determine and provide to a user a capability-specific loading of the network by the given application; and
further using the ordered relationship hierarchy to establish an order in which the processor evaluates the one or more network capabilities.

2. The method of claim 1, wherein the given application is included in a given node of the network, the method further comprising performing the attributing and the modeling for each application of the given node; and based on the modeling, determining a capability-specific loading of the network by the given node.

3. The method of claim 2, performed for every node in the network to determine a total capability-specific loading of the network.

4. The method of claim 2, further comprising:
monitoring use of a resource of the network by a given one of the capabilities; and
based on the monitoring, identifying one or more applications causing a cumulative level of loading by the given one of the capabilities to exceed a predetermined level.

5. The method of claim 4, further comprising disabling the one or more identified applications.

6. The method of claim 2, further comprising:
adding one or more applications to the network which emulate network activity; and
performing the attributing and the modeling to observe one or more effects by the one or more added applications on performance of the network.

7. The method of claim 6, performed to predict performance of the network.

8. The method of claim 1, wherein the further comprises defining interoperability as the first capability for evaluation within the ordered relationship hierarchy of capabilities.

9. A method for real-time monitoring of the performance of a network including a plurality of nodes having one or more applications, the method comprising:
predefining an ordered relationship hierarchy of network capabilities providable by applications in the network;
for each of a plurality of applications of the network, attributing to the application one or more of the network capabilities and conditioning each of the one or more network capabilities attributed to the application by one or more performance parameters for the application;
using at least one processor to model each of the one or more network capabilities as conditioned by the application performance parameters to evaluate use of one or more network resources by the modeled capability as the plurality of applications execute in the network;
sampling use of a given resource in the network to monitor each of the one or more network capabilities; and
further using the ordered relationship hierarchy to establish an order in which the processor evaluates use of the one or more network capabilities;
based on the modeling and the monitoring, using the at least one processor to determine and provide to a user a capability-specific loading of the given resource by each one of the network capabilities; and
based on the evaluated use of the one or more network resources, identifying one or more applications causing a cumulative level of loading by a given one of the network capabilities to exceed a predetermined level.

10. The method of claim 9, wherein the sampling is performed on each of the plurality of applications executing in the network.

11. The method of claim 9, wherein the hierarchy is ordered based on relative dependencies intrinsic to the capabilities.

12. The method of claim 9, wherein the ordered relationship hierarchy of capabilities specifies an order in which the capabilities are evaluated, the method comprising predefining interoperability as the first capability for evaluation.

13. The method of claim 9, wherein the network capabilities include interoperability, information assurance, data management, knowledge management, and collaboration in communities of interest.

14. The method of claim 9, wherein the method is performed to determine a trend of a cumulative level of resource use by at least one of the predefined network capabilities.

15. A system for real-time monitoring of the performance of a network including a plurality of nodes having one or more applications, the system comprising one or more computers configured to:
  predefine an ordered relationship hierarchy of network capabilities providable by applications in the network;
  attribute one or more of the predefined network capabilities of the hierarchy to the applications;
  for substantially each application running in the network, for each of one or more predefined network capabilities attributed to the application, model resource usage by the application in support of the attributed network capability; and
  use the modeled usage to monitor, by network capability, network resource usage; and
  further use the ordered relationship hierarchy to establish an order in which the one or more computers evaluates the one or more network capabilities.

16. The system of claim 15, wherein the one or more computers are further configured to compare a level of resource use for one of the network capabilities to a predetermined performance level to monitor the one of the capabilities.

17. The system of claim 15, wherein the one or more computers are further configured to use one or more performance parameters associated with the one or more predefined network capabilities to model the resource usage.

18. The system of claim 15, wherein the one or more computers are further configured to sample resource usage by substantially each application running in the network to obtain a cumulative level of resource usage for each predefined network capability.

19. The system of claim 15, wherein the one or more computers are further configured to monitor, by capability, network resource usage by one or more of the nodes.

20. A method for real-time monitoring of the performance of a network having a plurality of applications, the method comprising:
  predefining an ordered relationship hierarchy of network capabilities in which an interoperability capability is the basis for the other predefined capabilities;
  attributing one or more of the capabilities of the hierarchy to each application;
  using at least one processor to dynamically monitor resource usage by a selected one of the capabilities across the applications, and using the at least one processor to determine a cumulative value for the monitored resource usage;
  using the at least one processor to determine when the cumulative value exceeds a predetermined value that affects the performance of the network; and
  providing a result of the determining to a user.

21. The method of claim 20, further comprising identifying an application and an attributed capability of the application causing the cumulative value to exceed the predetermined value.

22. The method of claim 20, wherein the cumulative value is compared to a minimum level for the selected capability, the minimum level defined to support a required overall mission probability of capability effectiveness.

23. A method for real-time monitoring of the performance of a network including a plurality of nodes having one or more applications, the method comprising:
  predefining an ordered relationship hierarchy of network capabilities providable by applications in the network;
  attributing, from the hierarchy, one or more of the network capabilities to a given application of the network;
  modeling each of the one or more attributed capabilities of the given application, the modeling being executed by at least one processor;
  using the processor to evaluate use of one or more network resources by the modeled capability as the given application executes in the network;
  based on the modeling, using the processor to determine and provide to a user a capability-specific loading of the network by the given application;
  monitoring use of a resource of the network by a given one of the capabilities; and
  based on the monitoring, identifying one or more applications causing a cumulative level of loading by the given one of the capabilities to exceed a predetermined level.

* * * * *